(12) United States Patent
Cluzel

(10) Patent No.: US 8,555,942 B2
(45) Date of Patent: Oct. 15, 2013

(54) HEAVY VEHICLE TIRE

(75) Inventor: Guy Cluzel, Beaumont (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 1439 days.

(21) Appl. No.: 11/596,609

(22) PCT Filed: May 6, 2005

(86) PCT No.: PCT/EP2005/004928
§ 371 (c)(1),
(2), (4) Date: Dec. 3, 2007

(87) PCT Pub. No.: WO2005/113258
PCT Pub. Date: Dec. 1, 2005

(65) Prior Publication Data
US 2008/0115873 A1    May 22, 2008

(30) Foreign Application Priority Data
May 13, 2004    (FR) ..................................... 04 05243

(51) Int. Cl.
*B60C 9/26*    (2006.01)
*B60C 9/22*    (2006.01)
*B60C 9/20*    (2006.01)

(52) U.S. Cl.
USPC ............................ 152/528; 152/531; 152/534

(58) Field of Classification Search
USPC .......................... 152/528, 529, 531, 533, 534
See application file for complete search history.

(56) References Cited

U.S. PATENT DOCUMENTS

| | | | |
|---|---|---|---|
| 3,881,538 A | | 5/1975 | Mirtain |
| 3,985,173 A | * | 10/1976 | Masson .......................... 152/529 |
| 4,237,953 A | | 12/1980 | Mathevet |
| 4,745,957 A | * | 5/1988 | Sumner .......................... 152/531 |
| 5,277,239 A | | 1/1994 | Okihara et al. |
| 6,612,353 B2 | * | 9/2003 | Cluzel ........................ 152/531 X |
| 2006/0169381 A1 | * | 8/2006 | Radulescu et al. ............ 152/531 |

FOREIGN PATENT DOCUMENTS

| | | | |
|---|---|---|---|
| EP | 92 498 A2 | * | 10/1983 |
| FR | 1 228 241 A | | 8/1960 |
| FR | 2 246 404 A | | 5/1975 |
| FR | 2 857 621 A1 | * | 1/2005 |
| JP | 06055907 A | * | 3/1994 |
| JP | 06115311 A | * | 4/1994 |
| JP | 10081109 A | * | 3/1998 |
| JP | 2002144813 A | * | 5/2002 |
| WO | WO 96/20095 A | | 7/1996 |

* cited by examiner

*Primary Examiner* — Adrienne C Johnstone
(74) *Attorney, Agent, or Firm* — Cozen O'Connor

(57) ABSTRACT

The invention relates to a tire having a radial carcass reinforcement comprising a crown reinforcement formed of at least two working crown layers of reinforcement elements, which are crossed from one layer to the other, forming with the circumferential direction angles of between 10° and 45°, which itself is topped radially by a tread, said tread being joined to two beads by means of two sidewalls and the crown reinforcement comprising between two working crown plies at least one additional ply of reinforcement elements. According to the invention, the axial ends of the reinforcement element working ply radially closest to the carcass reinforcement are turned up to cover the axial ends of a working crown ply radially external to the additional ply.

17 Claims, 4 Drawing Sheets

HEAVY VEHICLE TIRE

This is a National Phase Application under 35 USC 371 of International Application PCT/EP2005/004928, filed on May 6, 2005.

The present invention relates to a tire having a radial carcass reinforcement anchored on either side to at least one bead wire and having a crown reinforcement formed of at least two so-called working plies which are superposed and formed of cords or cables which are parallel within each ply and are crossed from one ply to the next, forming angles of at most 45° in absolute value with the circumferential direction of the tire.

It relates more particularly to a tire of the "heavy-vehicle" type, the ratio of the height on rim H to the maximum axial width S of which is at most equal to 0.80 and which is intended to be fitted on a medium- or high-tonnage vehicle, such as a lorry, bus, trailer, etc.

BACKGROUND OF THE INVENTION

Certain current tires, referred to as "highway" tires, are intended to travel at high speed and on increasingly long journeys, owing to the improvement in road networks and the growth in motorway networks throughout the world. All the conditions under which such a tire is required to travel without doubt make it possible to increase the number of kilometres travelled, the wear of the tire being less; on the other hand, the endurance of the latter, and in particular of the crown reinforcement, is impaired.

The lack of endurance relates both to the resistance to fatigue of the crown plies, and in particular the resistance to separation between ends of plies, and the resistance to fatigue of the cables of the portion of carcass reinforcement located beneath the crown reinforcement, the first inadequacy being greatly influenced by the operating temperature prevailing at the edges of the working plies, be it when traveling in a straight line or during drift travel.

A first solution has been described in patent application WO96/20095 and proposes arranging, on one hand between the carcass reinforcement and the crown reinforcement working ply radially closest to the axis of rotation, an axially continuous ply, formed of inextensible metal cables forming an angle at least equal to 60° with the circumferential direction, and the axial width of which is at least equal to the axial width of the shortest working crown ply, and on the other hand between the two working crown plies, an additional ply formed of metallic elements which are oriented substantially parallel to the circumferential direction, the axial width of said ply being at least equal to 0.7 S0.

The problems relating to the separation between working plies and the resistance to fatigue of the carcass reinforcement cables are thus substantially reduced, and the operating temperatures are lowered; on the other hand prolonged travel of the tires thus constructed caused fatigue failure to appear in the cables of the additional ply and more particularly the edges of said ply, whether the so-called triangulation ply be present or not.

In order to overcome these new drawbacks mentioned above and to improve the endurance of the crown reinforcement of the type of tire in question, patent application WO99/24269, not published to date, proposes, on either side of the equatorial plane and in the immediate axial extension of the additional ply of reinforcement elements which are substantially parallel to the circumferential direction, to couple, over a certain axial distance, the two working crown plies formed of reinforcement elements crossed from one ply to the next, then to decouple them by means of profiled elements of rubber mix at least over the remainder of the width common to said two working plies.

In order to improve the endurance of the crown reinforcement of the type of tire in question, without being faced with problems of fatigue of reinforcement elements, patent application WO99/58350 radically modifies the orientation of the inextensible reinforcement elements of the additional ply arranged radially between said working plies, said elements then being radial.

The shearing stresses between the two working crown plies are very great and more particularly in the case of coupling of the two what are called working plies, which involves delamination between the plies as the tire becomes fatigued.

Patent application WO 99/58351 thus proposes, associated with an additional ply the orientation of the reinforcement elements of which is radial, coupling the two working crown plies in the immediate axial extension of the additional ply, these then being decoupled by profiled elements of rubber mix at least over the remainder of the width common to said two working plies.

In order to overcome the above drawbacks and to improve still further the endurance of the crown reinforcement of such tires, patent application WO 00/69659 proposes combining the advantages of radial orientation with those of circumferential orientation of the reinforcement elements of the additional ply located radially between the two working crown plies. According to this document, an additional reinforcement formed of at least one ply of reinforcement elements, which is arranged radially between two working plies, is axially composed of three parts: a central part in the form of a ply formed of metallic reinforcement elements which are inextensible and substantially radial, and two lateral parts in the form of strips each formed of elastic circumferential metallic reinforcement elements.

U.S. Pat. No. 4,237,953 furthermore describes crown architectures formed of two working plies, the axial ends of one of them being turned up to cover the axial ends of the other ply with the aim of increasing the longitudinal rigidity of these zones.

Cables are said to be inextensible when said cables have a relative elongation at most equal to 0.2% under a tensile force equal to 10% of the breaking load.

Cables are said to be elastic when said cables have a relative elongation at least equal to 4% under a tensile force equal to the breaking load.

The circumferential direction of the tire, or longitudinal direction, is the direction corresponding to the periphery of the tire and defined by the direction of rolling of the tire. Circumferential reinforcement elements are elements which form angles within the range +2.5°, −2.5° around 0° with said direction.

The transverse or axial direction of the tire is parallel to the axis of rotation of the tire.

The radial direction is a direction intersecting and perpendicular to the axis of rotation of the tire. Substantially radial reinforcement elements are elements which form with the meridian direction angles within the range +5°, −5° around 0°.

The axis of rotation of the tire is the axis around which it rotates in normal use.

A radial or meridian plane is a plane containing the axis of rotation of the tire.

The circumferential median plane, or equatorial plane, is a plane which is perpendicular to the axis of rotation of the tire and divides the tire into two halves.

SUMMARY OF THE INVENTION

The inventors have set themselves the task of providing tires for "heavy vehicles", the endurance performance of which is improved still further compared with conventional tires.

This object is achieved according to the invention by a tire, for vehicles of heavy-vehicle type, having a radial carcass reinforcement comprising a crown reinforcement formed of at least two working crown plies of reinforcement elements, crossed from one ply to the other forming angles of between 10° and 45° with the circumferential direction, which itself is topped radially by a tread, said tread being joined to two beads by means of two sidewalls, the crown reinforcement comprising between two working crown plies at least one additional ply of reinforcement elements, the axial ends of the reinforcement element working ply radially closest to the carcass reinforcement being turned over to cover the axial ends of a working crown ply radially external to the additional ply.

A tire of heavy-vehicle type thus produced results in wear properties which are entirely satisfactory and, furthermore it would appear that the endurance of such a tire is improved still further; the upturn of the radially internal working ply contributes to improving the endurance of the tire, the influence of the free ends of the working plies being substantially decreased.

According to one preferred embodiment of the invention, the reinforcement elements of the reinforcement element ply radially closest to the carcass reinforcement are elastic. Such an embodiment of the invention simplifies in particular the process of manufacturing the tire and may provide other advantages which will be returned to later, according to the embodiment of the crown reinforcement.

According to one advantageous embodiment of the invention, the axial ends of the reinforcement element ply radially closest to the carcass reinforcement cover the axial ends of the radially outermost working crown ply. According to this preferred embodiment of the invention, whatever the number of working plies, no end of said plies is left free.

More advantageously still according to the invention, the additional ply is formed, over at least part of the axial width, of circumferentially oriented reinforcement elements. The presence of circumferential reinforcement elements permits in particular an improvement in the wear properties of the tire.

One advantageous embodiment of the invention provides for the axial ends of the reinforcement element ply radially closest to the carcass reinforcement to be axially internal to the axial ends of the additional ply of reinforcement elements. According to this advantageous embodiment of the invention, the upturned ends of the reinforcement element ply radially closest to the carcass reinforcement cover radially the ends of the additional ply for better endurance of the crown reinforcement and in particular of said additional ply.

According to a first variant embodiment of the invention, the layer of circumferential reinforcement elements is advantageously a layer which is continuous over its entire axial width.

The presence in the tire according to the invention of a layer of circumferential reinforcement elements the width of which satisfies the relationship above permits in particular a reduction in the shearing stresses between the working layers and therefore thereby improves still further the endurance performance of the tire.

Furthermore, travel using such tires which satisfy the criteria of the invention has shown that the circumferential reinforcement elements do not exhibit any break, including at the ends of the layer of circumferential reinforcement elements.

According to a second variant embodiment of the invention, the additional ply is formed of at least two lateral parts in the form of strips each formed of circumferential reinforcement elements.

More preferably still according to this second variant, the additional ply furthermore comprises a central part formed of a ply consisting of substantially radial reinforcement elements. Such a ply also contributes to the reduction in the shearing stresses between the working layers and hence improves still further thereby the endurance performance of the tire, in particular by limiting the increases in temperature of the rubber compound.

According to one or the other of these variant embodiments, better rigidity of the shoulders of the tire is observed, which is beneficial in reducing the risks of irregular wear of the tread which increase when the form ratio of the tires decreases.

The production of the tire, comprising turning up of the ends of the radially innermost working ply, makes it possible, furthermore, to contribute to the rigidity of the reinforcement armature in the axially outer zones of the tire and thus to improve the endurance of the circumferential reinforcement elements which are particularly sensitive in these zones.

According to a first advantageous embodiment of the invention, the reinforcement elements of the ply of circumferential reinforcement elements are metallic reinforcement elements having a secant modulus at 0.7% elongation of between 10 and 120 GPa and a maximum tangent modulus of less than 150 GPa.

According to a preferred embodiment, the secant modulus of the reinforcement elements at 0.7% elongation is less than 100 GPa, preferably greater than 50 GPa and more preferably still of between 60 and 90 GPa.

Preferably also, the maximum tangent modulus of the reinforcement elements is less than 130 GPa.

The secant modulus is measured on a curve of tensile stress as a function of the elongation determined with a pre-load of less than 5 kg.

According to one preferred embodiment, the reinforcement elements of the ply of circumferential reinforcement elements are metallic reinforcement elements having a curve of tensile stress as a function of the relative elongation having shallow gradients for the low elongations and a substantially constant, steep gradient for the higher elongations. Such reinforcement elements of the ply of circumferential reinforcement elements are usually referred to as "bi-modular" elements.

According to a preferred embodiment of the invention, the substantially constant, steep gradient appears from a relative elongation of between 0.2% and 0.8% onwards.

The different characteristics of the reinforcement elements mentioned above are measured on reinforcement elements taken from tires.

Reinforcement elements which are more particularly suitable for producing the ply of circumferential reinforcement elements according to the invention are for example assemblies of formula 21.23; this stranded cable is formed of 21 elementary cords of a diameter of 23/100 mm and of formula 3×(1+6), with 3 strands formed of 7 cords, one cord forming a central core, which are twisted together. In the same manner, another example of reinforcement elements is an assembly of formula 21.28.

The use of such reinforcement elements in at least one ply of circumferential reinforcement elements makes it possible in particular to retain satisfactory rigidities of the ply including after the stages of shaping and of curing in conventional manufacturing processes.

According to a second embodiment of the invention, the circumferential reinforcement elements may be formed of inextensible metallic elements cut so as to form sections of a length very much less than the circumference of the least long ply, but preferably greater than 0.1 times said circumference, the cuts between sections being axially offset from each other. More preferably still, the modulus of elasticity in tension per unit of width of the additional ply is less than the modulus of elasticity in tension, measured under the same conditions, of the most extensible working crown ply. Such an embodiment makes it possible to impart to the ply of circumferential reinforcement elements, in simple manner, a modulus which can easily be adjusted (by selecting the intervals between sections of one and the same row), but which is in all cases lower than the modulus of the ply formed of the same metallic elements, which are however continuous, the modulus of the additional ply being measured on a vulcanised ply of cut elements, taken from the tire.

According to a third embodiment of the invention, the circumferential reinforcement elements are undulating metallic elements, the ratio a/λ of the amplitude of undulation to the wavelength being at most equal to 0.09. Preferably, the modulus of elasticity in tension per unit of width of the additional ply is less than the modulus of elasticity in tension, measured under the same conditions, of the most extensible working crown ply.

The metallic elements are preferably steel cables.

More advantageously still, the axial widths of the working crown plies radially adjacent to an additional ply of circumferential reinforcement elements are greater than the axial width of said additional ply and preferably said working crown plies adjacent to the additional ply are on either side of the equatorial plane and in the immediate axial extension of the additional ply coupled over an axial width, in particular when the working ply which is turned up at its ends is not adjacent to said additional ply.

The presence of such coupling between the working crown plies adjacent to the ply of circumferential reinforcement elements also permits the reduction in the tensile stresses acting on the axially outermost circumferential elements located closest to the coupling. "Coupled plies" are to be understood to mean plies, the respective reinforcement elements of which are separated radially by at most 1.5 mm, said thickness of rubber being measured radially between the upper and lower generatrices respectively of said reinforcement elements.

The invention also advantageously provides, in order to reduce the tensile stresses acting on the axially outermost circumferential elements, for the angle formed with the circumferential direction by the reinforcement elements of the working crown layers to be less than 30° and preferably less than 25°.

According to another advantageous variant of the invention, the working crown layers comprise reinforcement elements, crossed from one ply to the other, forming with the circumferential direction angles which are variable in the axial direction, said angles being greater on the axially outer edges of the layers of reinforcement elements compared with the angles of said elements measured at the level of the circumferential median plane. Such an embodiment of the invention makes it possible to increase the circumferential rigidity in some zones and on the contrary to reduce it in others, in particular in order to reduce the compressions of the carcass reinforcement.

One preferred embodiment of the invention also provides for the crown reinforcement to be finished off radially to the outside by at least one additional layer, referred to as a protective layer, of what are called elastic reinforcement elements, which are oriented relative to the circumferential direction at an angle of between 10° and 45° and of the same direction as the angle formed by the inextensible elements of the working layer which is radially adjacent thereto.

According to a first embodiment of the invention, the protective ply tops the upturned ends of the radially inner working ply, in particular when they are radially external to the radially outermost working ply.

According to another embodiment of the invention, the protective ply is positioned axially between the upturned ends of the radially inner working ply, and advantageously its axial ends are contiguous, or axially juxtaposed, on the upturned ends of the radially inner working ply, in particular when they are radially external to the radially outermost working ply.

According to a last embodiment of the invention, the upturned ends of the radially inner working ply are radially external to the protective ply, and preferably cover the ends of said protective ply.

One variant embodiment of the invention, according to which the reinforcement elements of the radially inner working ply are elastic, provides for the upturned parts of said radially inner working ply to have a function similar to that of a protective ply, in particular when said upturned reinforcement elements are not crossed with the elements of the reinforcement ply which is radially adjacent thereto. Preferably, according to this variant embodiment, the reinforcement elements of the radially inner working ply and the elements of the radially outer working ply have opposing angles of the same value. In this variant embodiment, a supplementary protective ply is no longer useful.

According to any one of the embodiments of the invention mentioned previously, the crown reinforcement may also be finished off, radially to the inside between the carcass reinforcement and the radially inner working layer closest to said carcass reinforcement, by a triangulation layer of inextensible metallic reinforcement elements made of steel forming, with the circumferential direction, an angle greater than 50° in absolute value.

BRIEF DESCRIPTION OF THE DRAWINGS

Other advantageous details and characteristics of the invention will become apparent hereafter from the description of the examples of embodiment of the invention with reference to FIGS. 1 to 5, which represent.

The figures are not shown to scale in order to simplify understanding thereof. The figures show only a half-view of a tire which is extended symmetrically relative to the axis XX' which represents the circumferential median plane, or equatorial plane, of a tire.

DETAILED DESCRIPTION OF THE INVENTION

Figure 1:
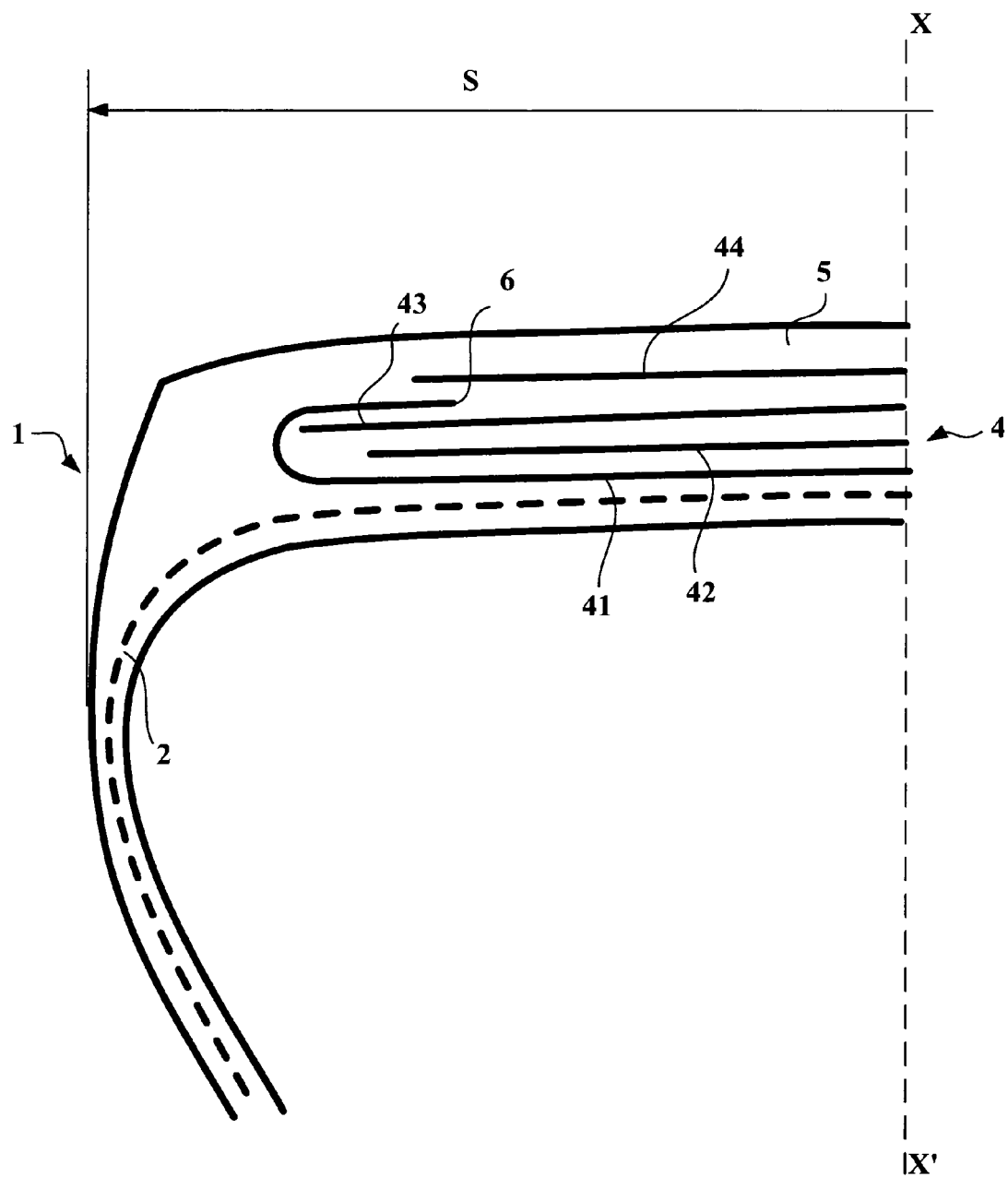
FIG. 1: a partial meridian view of a diagram of a tire according to one embodiment of the invention.

In FIG. 1, the tire 1, of dimension 385/55 R 22.5 X, has a form ratio H/S of 0.55, H being the height of the tire 1 on its mounting rim and S its maximum axial width. Said tire 1 comprises a radial carcass reinforcement 2 anchored in two beads, which are not shown in the figures. The carcass reinforcement is formed of a single layer of metal cables. This carcass reinforcement 2 is wrapped by a crown reinforcement 4, formed radially from the inside to the outside:

- of a first working ply 41 formed of 21×23 metal cables made of steel, of "bimodular" type, which are continuous over the entire width of the ply, and are oriented at an angle equal to 20°,
- of a ply of circumferential reinforcement elements 42 which is formed of 21×28 metal cables made of steel, of "bi-modular" type",
- of a second working ply 43 formed of non-wrapped inextensible 11.35 metal cables which are continuous over the entire width of the ply, oriented at an angle of 16° and crossed with the metal cables of the layer 41,
- of a protective ply 44 formed of elastic 18×23 metal cables.

The crown reinforcement is itself topped by a tread 5.

In accordance with the invention, the working ply 41 is turned up and its ends 6 are arranged radially to the outside of the working ply 43 and radially adjacent thereto. The upturned ends 6 of the working ply 41 are radially covered by the protective ply 44.

In accordance with the invention, the upturn of the working ply 41 makes it possible to eliminate the free ends of the working plies and to limit the displacement of these ends during travel while increasing the rigidity at the shoulders of the tire. The ply 42 of circumferential reinforcement elements for its part contributes to improving in particular the wear resistance of the tire, in association with the upturn of the working ply 41, owing to the increase in rigidity. It also makes it possible to improve the stability of the crown of the tire during inflation. Furthermore, the upturns of the working ply 41 cover the ends of said ply 42 of circumferential reinforcement elements over a width L and thus improve the endurance of these circumferential reinforcement elements owing in particular to the contribution of the upturned parts of the working ply 41 to the rigidity of the reinforcement in particular in the axially extreme parts of the ply 42. The width of coverage L is advantageously greater than four times the pitch of the circumferential reinforcement elements of the ply 42.

The ply 42 in the example described is a continuous ply of circumferential reinforcement elements but could also be formed, in accordance with the invention, of two narrower plies of circumferential reinforcement elements, axially spaced apart from one another and advantageously positioned substantially at the level of the shoulders of the tire. These two plies of circumferential reinforcement elements may also be axially separated by a ply of radially-oriented reinforcement elements.

Figure 2:
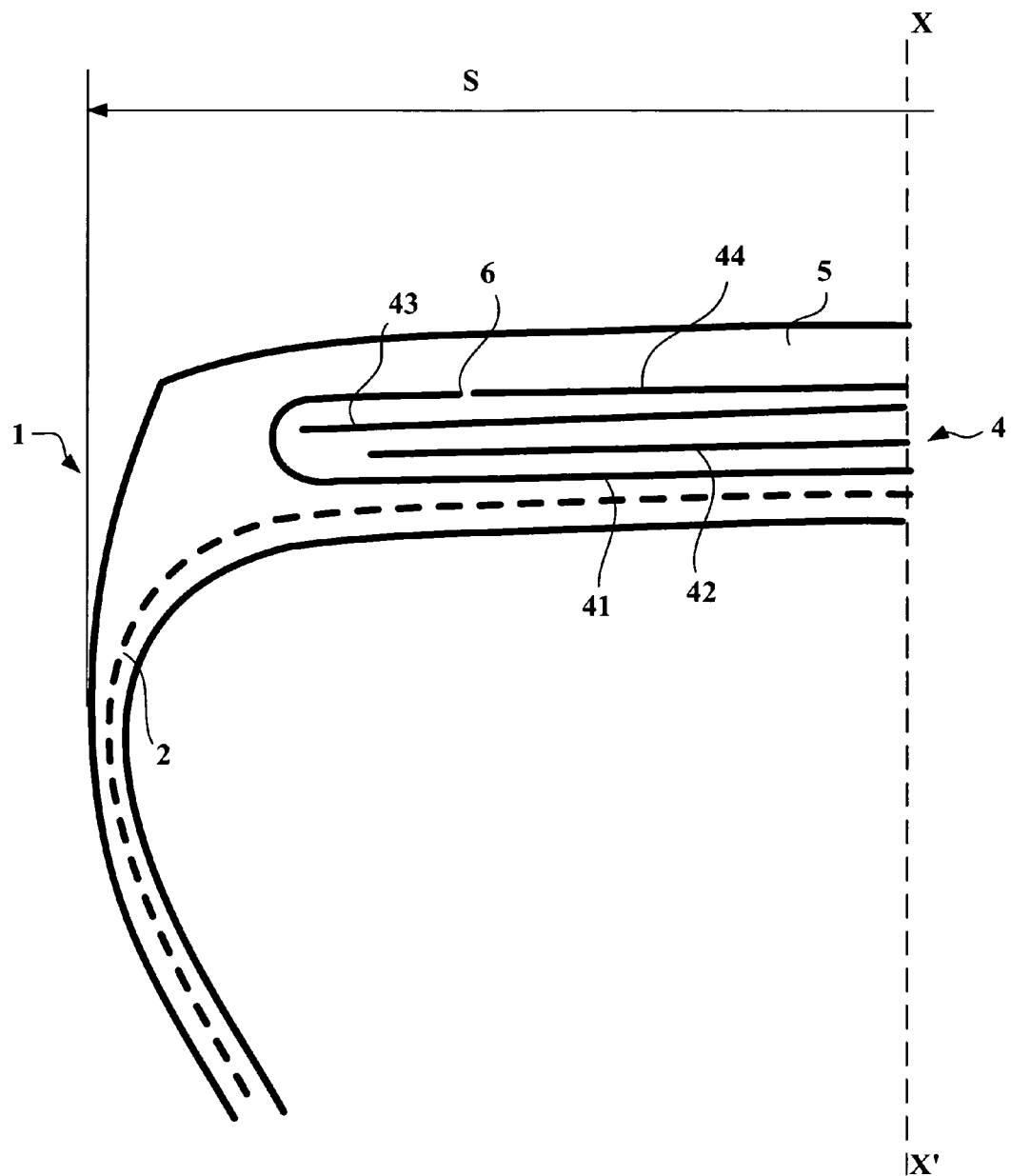
FIG. 2: a partial meridian view of a diagram of a tire according to a second embodiment of the invention.

In FIG. 2, the tire 1 differs from that shown in FIG. 1 in that the protective ply 44 is axially inserted between the ends 6 of the upturns of the working ply 41. Such an embodiment makes it possible in particular to limit the thickness of the crown reinforcement in particular relative to the case of FIG. 1.

Figure 3:
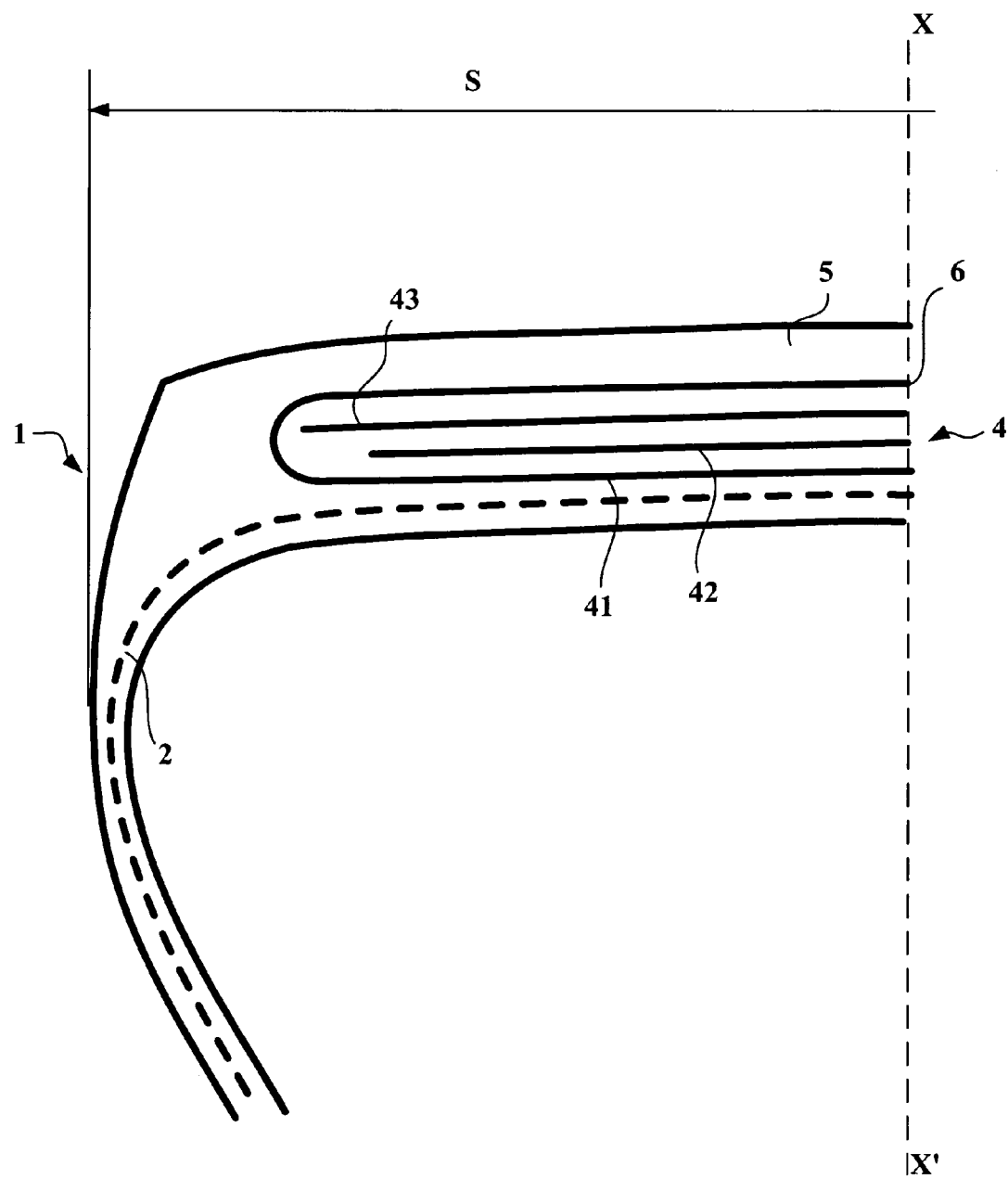
FIG. 3: a partial meridian view of a diagram of a tire according to a third embodiment of the invention.

In FIG. 3, the tire 1 differs from those depicted in the preceding figures in that it does not comprise a protective ply. On the other hand, the upturns of the working ply 41 are axially extended and the ends 6 are axially contiguous with each other. The upturns of the working ply 41 thus functionally substitute for a protective ply. Advantageously the angles of the two working plies 41, 43 are identical in absolute value so [that] the protective function performed by the upturns of the working ply 41 is optimal.

Figure 4:
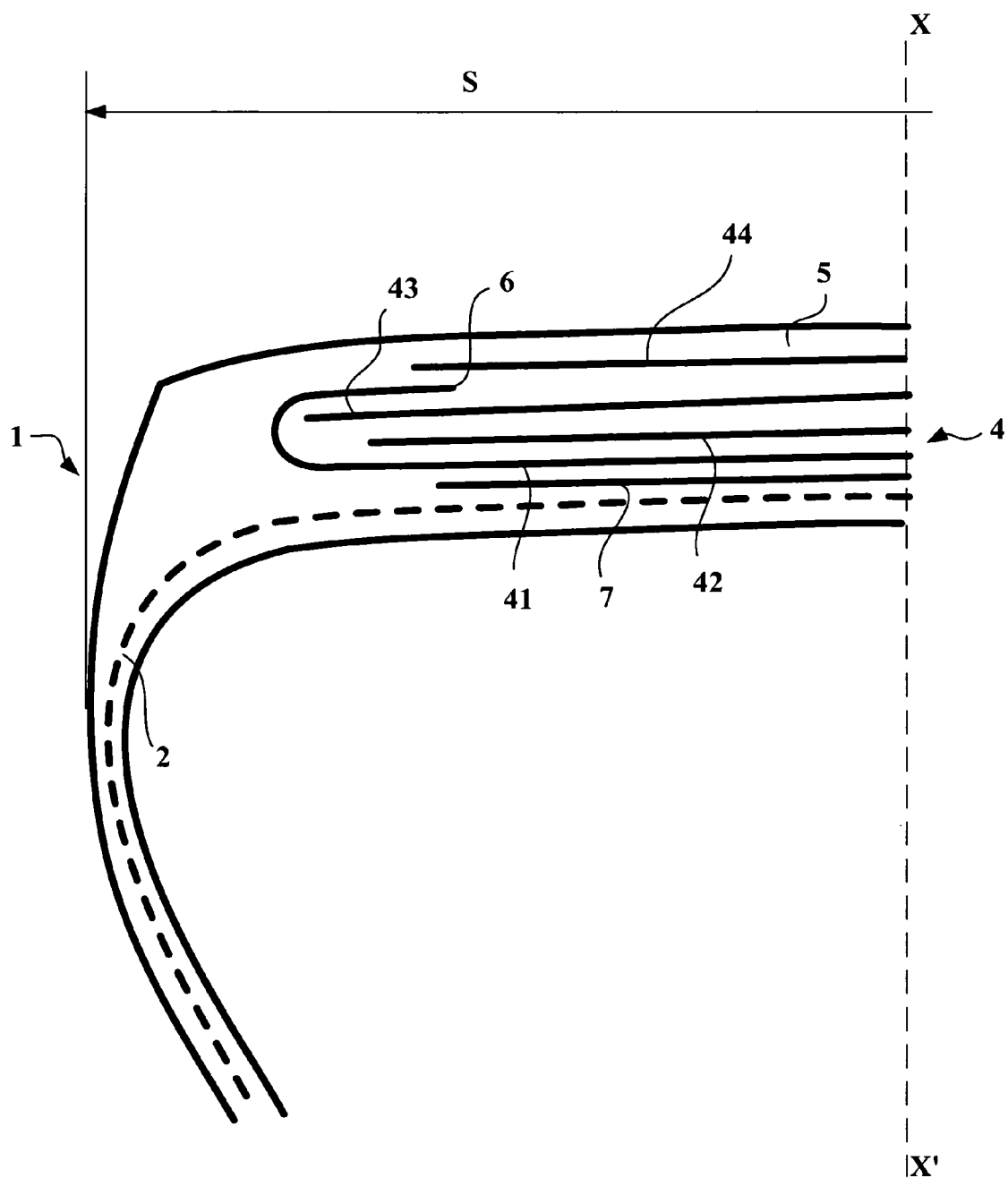
FIG. 4: a partial meridian view of a diagram of a tire according to a fourth embodiment of the invention.

In FIG. 4, the tire 1 is a variant embodiment of the one shown in FIG. 1 in which the crown reinforcement comprises a triangulation ply 7 inserted radially between the carcass reinforcement and the working ply 41. The triangulation ply 7 is formed of inextensible non-wrapped metal 11×35 cables, oriented at an angle of 50°, said metal cables being crossed with the reinforcement elements of the ply 41.

Tests were carried out with the tire produced according to the invention in accordance with what is depicted in FIG. 2, and were compared with a reference tire identical in dimensions and comprising two working plies and a ply comprising circumferentially oriented reinforcement elements which is inserted radially between the two working plies, said two working plies being decoupled.

This reference tire therefore does not comprise an upturn of the working reinforcement element ply radially closest to the carcass reinforcement.

The tests performed consisted of destructive running tests on a test drum; this type of test on a test drum simulates tests on either a straight-line circuit or a high-drift circuit.

The load and pressure conditions are the same for the tire according to the invention and for the reference tire. The inflation pressure of the tires is 10 bar when hot. The rated load is 4500 kg and the tire undergoes an increase of 150 daN every 5000 km.

Two types of destructive running tests were thus carried out:

- the first test consists of a running test on a test drum, the tire following a path in a straight line. The results obtained from this test showed that the tire according to the invention permits a greater mileage before any breaking of the tire is noticed. The tire according to the invention covered 40,500 km, whereas the reference tire was totally degraded after 25,000 km.
- the second test is similar to the previous one, but with the tire being subjected to a drift cycle. It would appear that, as in the previous test, the tire according to the invention covered a greater mileage, corresponding to 15% more than the reference tire.

The invention claimed is:

1. A tire for vehicles of heavy-vehicle type, having a radial carcass reinforcement comprising a crown reinforcement formed of at least two working crown plies of reinforcement elements, crossed from one ply to the other forming angles of between 10° and 45° with the circumferential direction, which itself is topped radially by a tread, said tread being joined to two beads by means of two sidewalls, the crown reinforcement comprising between two working crown plies at least one additional ply of reinforcement elements, wherein axial widths of the at least two working crown plies radially adjacent to the at least one additional ply are greater than an axial width of the at least one additional ply, wherein the axial termination ends of the reinforcement element working ply radially closest to the carcass reinforcement are turned up to cover the axial termination ends of a working crown ply radially external to the at least one additional ply, and wherein the reinforcement elements of the at least one additional ply are formed of metallic circumferentially oriented reinforcement elements over at least part of the axial width of the at least one additional ply.

2. A tire according to claim 1, wherein the axial termination ends of the reinforcement element working ply radially closest to the carcass reinforcement are axially internal to the axial termination ends of the at least one additional ply of reinforcement elements.

3. A tire according to claim 1, wherein the reinforcement elements of the reinforcement element working ply radially closest to the carcass reinforcement are elastic.

4. A tire according to claim 1, wherein the axial termination ends of the reinforcement element working ply radially closest to the carcass reinforcement cover the axial termination ends of the radially outermost working crown ply.

5. A tire according to claim 1, wherein the at least one additional ply is formed of at least two lateral parts in the form of strips each formed of the metallic circumferentially oriented reinforcement elements.

6. A tire according to claim 5, wherein the at least one additional ply comprises a central part formed of a ply consisting of substantially radial reinforcement elements.

7. A tire according to claim 1, wherein the metallic circumferentially oriented reinforcement elements have a secant modulus at 0.7% elongation of between 10 and 120 GPa and a maximum tangent modulus of less than 150 GPa.

8. A tire according to claim 7, wherein the secant modulus of the reinforcement elements at 0.7% elongation is less than 100 Gpa.

9. A tire according to claim 7, wherein the maximum tangent modulus of the reinforcement elements is less than 130 GPa.

10. A tire according to claim 1, wherein the metallic circumferentially oriented reinforcement elements have a curve of tensile stress as a function of the relative elongation having shallow gradients for the low elongations and a substantially constant, steep gradient for the higher elongations.

11. A tire according to claim 1, wherein the metallic circumferentially oriented reinforcement elements are cut so as to form sections of a length less than the circumference of the least long additional ply, but greater than 0.1 times said circumference, the cuts between sections being axially offset from each other.

12. A tire according to claim 1, wherein the metallic circumferentially oriented reinforcement elements are undulating metallic reinforcement elements, the ratio $a/\lambda$ of the amplitude of undulation a to the wavelength $\lambda$ being at most equal to 0.09.

13. A tire according to claim 1, wherein the angle formed with the circumferential direction by the reinforcement elements of the working crown layers is less than 30°.

14. A tire according to claim 1, wherein the working crown layers comprise reinforcement elements, crossed from one ply to the other, forming angles which are varied in the axial direction with the circumferential direction.

15. A tire according to claim 1, wherein the crown reinforcement furthermore comprises a triangulation layer formed of metallic reinforcement elements forming angles greater than 50° in absolute value with the circumferential direction.

16. A tire according to claim 1, wherein the crown reinforcement is finished off radially to the outside by at least one supplementary ply, referred to as a protective ply, of what are called elastic reinforcement elements, which are oriented relative to the circumferential direction at an angle of between 10° and 45° and of the same direction as the angle formed by the inextensible elements of the working ply which is radially adjacent thereto.

17. A tire according to claim 16, wherein the axial termination ends of the protective ply are axially juxtaposed on the axial termination ends of the reinforcement element working ply radially closest to the carcass reinforcement which are turned up to cover the axial termination ends of a working crown ply radially external to the at least one additional ply.

* * * * *